(12) United States Patent
Kang et al.

(10) Patent No.: US 11,679,376 B2
(45) Date of Patent: Jun. 20, 2023

(54) CATALYST FOR PREPARING LIGHT OLEFIN, PREPARATION METHOD THEREFOR, AND METHOD FOR PREPARING LIGHT OLEFIN BY USING SAME

(71) Applicant: KOREA RESEARCH INSTITUTE OF CHEMICAL TECHNOLOGY, Daejeon (KR)

(72) Inventors: Na Young Kang, Daejeon (KR); Yong Ki Park, Daejeon (KR); Yu Jin Lee, Dangjin-si (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 70 days.

(21) Appl. No.: 17/053,174

(22) PCT Filed: May 2, 2019

(86) PCT No.: PCT/KR2019/005245
§ 371 (c)(1),
(2) Date: Nov. 5, 2020

(87) PCT Pub. No.: WO2019/245157
PCT Pub. Date: Dec. 26, 2019

(65) Prior Publication Data
US 2021/0162372 A1   Jun. 3, 2021

(30) Foreign Application Priority Data
Jun. 20, 2018   (KR) .................. 10-2018-0070680

(51) Int. Cl.
| B01J 21/16 | (2006.01) |
| B01J 23/50 | (2006.01) |
| B01J 27/16 | (2006.01) |
| B01J 29/06 | (2006.01) |
| B01J 35/10 | (2006.01) |
| C10G 11/02 | (2006.01) |
| C10G 11/18 | (2006.01) |

(52) U.S. Cl.
CPC ............ B01J 21/16 (2013.01); B01J 23/50 (2013.01); B01J 27/16 (2013.01); B01J 29/06 (2013.01); B01J 35/1052 (2013.01); C10G 11/02 (2013.01); C10G 11/18 (2013.01); C10G 2300/703 (2013.01); C10G 2400/20 (2013.01)

(58) Field of Classification Search
CPC ... B01J 21/16; B01J 23/50; B01J 27/16; B01J 29/06; B01J 35/1052; B01J 37/0018; C10G 11/02; C10G 11/05; C10G 11/18; C10G 2300/703; C10G 2400/20; Y02P 30/20; Y02P 30/40
See application file for complete search history.

(56) References Cited

U.S. PATENT DOCUMENTS

| 5,773,676 A | 6/1998 | Drake et al. |
| 2012/0275994 A1 | 11/2012 | Gao et al. |

FOREIGN PATENT DOCUMENTS

| CA | 2779312 | * | 5/2011 | .............. B01J 37/02 |
| CN | 1162274 A | | 10/1997 | |
| CN | 1274342 A | | 11/2000 | |
| CN | 1721071 A | | 1/2006 | |
| CN | 101035619 A | | 9/2007 | |
| CN | 101233213 A | | 7/2008 | |
| CN | 101939095 A | | 1/2011 | |
| CN | 104437594 A | | 3/2015 | |
| CN | 107913726 A | | 4/2018 | |
| KR | 100233194 B1 | | 12/1999 | |
| KR | 10-2001-0024221 A | | 3/2001 | |
| KR | 100767958 B1 | | 10/2007 | |
| KR | 10-2009-0085964 A | | 8/2009 | |
| WO | WO 2019/005245 A1 | | 1/2019 | |

OTHER PUBLICATIONS

Haber, J. et al. (1995) Pure and Applied Chemistry, 67, 8/9, 1257-1306 [Office action cites p. 1268].*
International Search Report PCT/ISA/210 for International Application No. PCT/KR2019/005245 dated Aug. 19, 2019.
Extended European Search Report dated Feb. 10, 2022, issued in corresponding European Patent Application No. 19822861.1.
Japanese Office Action dated Nov. 24, 2021, issued in corresponding Japanese Patent Application No. 2020-560172.
Chinese Office action dated Oct. 14, 2022 for corresponding CN Patent Application No. 201980033511.4.
Saudi Arabian Office action dated Dec. 6, 2022 for corresponding SA Patent Application No. 520420618.
Chinese Offfice Action dated Mar. 17, 2023 for corresponding Chinese Patent Application No. 201980033511.4.
Huai, M. "Industrial Pollution Accounts five-vocational education in national planning materials" *China Environmental Science Press*, (Dec. 1, 2014).

* cited by examiner

*Primary Examiner* — Brian A McCaig
(74) *Attorney, Agent, or Firm* — Harness, Dickey & Pierce, P.L.C.

(57) ABSTRACT

The present invention relates to a catalyst for preparing a light olefin, a preparation method therefor, and a method for preparing a light olefin by using same, and can provide a catalyst for preparing a light olefin, a preparation method therefor, and a method for preparing a light olefin by using same, the catalyst comprising a porous zeolite, a clay, an inorganic oxide binder, and $Ag_2O$ and $P_2O_5$ which are supported in the pores and/or on the surface of the porous zeolite.

12 Claims, No Drawings

CATALYST FOR PREPARING LIGHT OLEFIN, PREPARATION METHOD THEREFOR, AND METHOD FOR PREPARING LIGHT OLEFIN BY USING SAME

CROSS-REFERENCE TO RELATED APPLICATIONS

This application is a national phase under 35 U.S.C. § 371 of PCT International Application No. PCT/KR2019/005245 which has an International filing date of May 2, 2019, which claims priority to Korean Application No. 10-2018-0070680, filed Jun. 20, 2018, the entire contents of each of which are hereby incorporated by reference.

TECHNICAL FIELD

The present invention relates to a catalyst for preparing a light olefin, a method of preparing the same, and a method of preparing a light olefin using the same.

BACKGROUND ART

As representative technology for producing a light olefin which is a basic oil component in the petrochemical industry, steam naphtha cracking (SNC) produces both ethylene and propylene by a pyrolysis process using a high temperature of 800° C. or more.

However, SNC has high energy consumption due to a high temperature condition and emits excess carbon dioxide.

Naphtha catalytic cracking (advanced catalytic olefins (ACOTN) which was developed for improving the disadvantage still has limitations of high energy consumption and high methane production, though a reaction temperature was lowered by 150° C. or more using a catalyst.

In recent years, studies for promoting efficiency of a process by co-feeding a raw material such as methanol as well as naphtha to a naphtha catalytic cracking reaction, have been conducted, and the advantage of the technology is characterized by forming thermal neutralization by combining naphtha cracking which is a strong endothermic reaction and a methanol conversion reaction which is an exothermic reaction.

When methanol is co-fed to naphtha, decomposition of a hydrocarbon is converted so that a strong endothermic reaction process is changed to a relatively strong or relatively weak endothermic reaction process, thereby maintaining an initial reaction temperature as it is.

Thus, a temperature of a regeneration unit is relatively lowered to decrease deactivation of a catalyst, thereby improving a yield of a low-carbon olefin such as ethylene and propylene and also significantly decreasing an energy usage.

In the case of catalytic cracking reaction technology using a naphtha and methanol-mixed raw material having the advantage, the following catalytic characteristics are required for selectively producing a light olefin from the same catalyst under the same conditions based on a fluidized bed reactor.

In order to produce a light olefin such as ethylene and propylene with high selectivity by catalytic cracking a raw material in which naphtha and methanol are mixed with a catalyst, an acid site characteristic of a molecular sieve should be appropriately adjusted. When an acid site amount or an acid site intensity of the molecular sieve is too large, a dehydrogenation reaction excessively proceeds to increase a yield of a saturated hydrocarbon including methane or an aromatic compound such as benzene, toluene, or xylene, and when too small, a yield of the light olefin is lowered by a decrease of a hydrocarbon conversion rate.

The molecular sieve which is a core material of a catalyst for catalytic cracking has a problem in that when the molecular sieve is placed under a high temperature and high humidity atmosphere of 500° C. or higher in the presence of water vapor, aluminum positioned in a framework of the molecular sieve is released (dealuminated), so that the structure collapses and simultaneously the acid sites which are active sites of the catalyst are decreased to rapidly decrease catalytic activity.

In addition, for using the molecular sieve in a large-scale fluidized bed petrochemical process such as catalytic cracking, the molecular sieve should have high mechanical strength.

Thus, development of a molding catalyst which shows a high light olefin preparation selectivity, is not deactivated even under a high temperature and high humidity atmosphere to have excellent hydrothermal stability, and allows fluidized bed reaction operation for a long period of time due to high durability, when a light olefin is prepared by catalytic cracking of naphtha and methanol based on a fluidized bed reaction, is continuously demanded.

DISCLOSURE

Technical Problem

An object of the present invention is to provide a catalyst for preparing a light olefin which shows a high light olefin preparation selectivity, is not deactivated even under a high temperature and high humidity atmosphere to have excellent hydrothermal stability, and allows fluidized bed reaction operation for a long period of time due to high durability, a method of preparing the same, and a method of preparing a light olefin using the same.

Technical Solution

In one general aspect, a catalyst for preparing a light olefin includes a porous zeolite; clay; an inorganic oxide binder; and $Ag_2O$ and $P_2O_5$ supported in internal micropores and/or on a surface of the porous zeolite.

An amount of $Ag_2O$ supported in the internal micropores and/or on the surface of the porous zeolite may be more than 0 wt % and 6 wt % or less with respect to 100 wt % of the catalyst.

The amount of $Ag_2O$ supported in the internal micropores and/or on the surface of the porous zeolite may be 0.2 wt % or more and 2.2 wt % or less with respect to 100 wt % of the catalyst.

The catalyst for preparing a light olefin of an embodiment of the present invention may satisfy the following Equation 1:

$$0 < W_a/W_b \leq 0.150 \qquad \text{[Equation 1]}$$

wherein $W_a$ is a content of $Ag_2O$ with respect to 100 wt % of the catalyst, and $W_b$ is a content of the clay with respect to 100 wt % of the catalyst.

1 wt % or more and 70 wt % or less of the porous zeolite; 15 wt % or more and 50 wt % or less of the clay; 1 wt % or more and 40 wt % or less of the inorganic oxide binder; and 1 wt % or more and 20 wt % or less of $P_2O_5$ supported in the internal micropores and/or on the surface of the porous zeolite may be included, with respect to 100 wt % of the catalyst.

The catalyst for preparing a light olefin may be a catalyst for preparing a light olefin which is a catalyst for preparing a light olefin by catalytic cracking of a mixed raw material including naphtha and methanol using a fluidized bed reactor.

In another general aspect, a method of preparing a catalyst for preparing a light olefin includes: preparing a first mixed solution including a porous zeolite, a silver precursor, and a phosphorus precursor; mixing an inorganic oxide precursor, an inorganic acid, and clay with the first mixed solution to prepare a second mixed solution; spray-drying the second mixed solution; and performing firing.

A content of the silver precursor in the second mixed solution may be an equivalent at which a content of $Ag_2O$ in the catalyst prepared in the firing step is more than 0 wt % and 6 wt % or less with respect to 100 wt % of the catalyst.

The content of the silver precursor and the content of the clay in the second mixed solution may be equivalents at which the catalyst prepared in the firing step satisfies the following Equation 1:

$$0 < W_a/W_b \leq 0.150 \quad \text{[Equation 1]}$$

wherein $W_a$ is a content of $Ag_2O$ with respect to 100 wt % of the catalyst, and $W_b$ is a content of the clay with respect to 100 wt % of the catalyst.

The catalyst prepared in the firing step may be the catalyst for preparing a light olefin of the embodiment of the present invention.

In still another general aspect, a method of preparing a light olefin includes: using the catalyst for preparing a light olefin of the embodiment of the present invention to subject a hydrocarbon, an oxygen-containing organic compound, or a mixture thereof to catalytic cracking.

In the method of preparing a light olefin, a fluidized bed reactor may be used.

Advantageous Effects

An embodiment of the present invention provides a catalyst for preparing a light olefin which shows a high light olefin preparation selectivity, is not deactivated even under a high temperature and high humidity atmosphere to have excellent hydrothermal stability, and allows fluidized bed reaction operation for a long period of time due to high durability, when a light olefin is prepared, a method of preparing the same, and a method of preparing a light olefin using the same.

BEST MODE

Unless otherwise defined herein, all terms used in the specification (including technical and scientific terms) may have the meaning that is commonly understood by those skilled in the art. Throughout the present specification, unless explicitly described to the contrary, "comprising" any elements will be understood to imply further inclusion of other elements rather than the exclusion of any other elements. In addition, unless explicitly described to the contrary, a singular form includes a plural form herein.

An embodiment of the present invention provides a catalyst for preparing a light olefin which shows a high light olefin preparation selectivity, is not deactivated even under a high temperature and high humidity atmosphere to have excellent hydrothermal stability, and allows fluidized bed reaction operation for a long period of time due to high durability, when a light olefin is prepared by catalytic cracking of a hydrocarbon such as naphtha, an oxygen-containing organic compound such as methanol, or a mixture thereof.

The hydrocarbon may include commonly available naphtha, and more specifically, may include a hydrocarbon having a boiling point of 30° C. or higher and 200° C. or lower. However, the hydrocarbon is not limited thereto.

The oxygen-containing organic compound may include methanol, but is not limited thereto.

In addition, the light olefin may include ethylene and/or propylene, but is not limited thereto.

Specifically, an embodiment of the present invention provides a catalyst for preparing a light olefin including: a porous zeolite; clay; an inorganic oxide binder; and $Ag_2O$ and $P_2O_5$ supported in internal micropores and/or on a surface of the porous zeolite.

The catalyst for preparing a light olefin of an embodiment of the present invention is a catalyst obtained by modifying an acid site of the porous zeolite with silver and phosphorus, further mixing an inorganic oxide binder and clay therewith, and stabilizing the mixture, and improves a yield of the light olefin and has excellent mechanical strength and hydrothermal stability to maintain a high activity characteristic for a long period of time.

In addition, simple preparation is possible as compared with conventional technology requiring a complicated zeolite modification step and a catalyst preparation step, and thus, the catalyst may be very advantageous for commercial application.

In the catalyst for preparing a light olefin of an embodiment of the present invention, $Ag_2O$ is supported in the internal micropores and/or on the surface of the porous zeolite, whereby the catalyst may show an excellent yield of a light olefin as compared with a catalyst in which $Ag_2O$ is not supported or a catalyst modified with another metal species, while showing an appropriate level of mechanical strength for being adopted in a fluidized bed reactor.

This was confirmed from the Examples described later, and specifically, the catalyst showed an excellent yield of a light olefin as compared with a catalyst modified with a La, Mg, or Mn oxide, while showing an appropriate level of mechanical strength for being adopted in a fluidized bed reactor.

In addition, since both $Ag_2O$ and $P_2O_5$ are supported in the internal micropores and/or on the surface of the porous zeolite, the inorganic oxide binder and the clay are included, whereby a high yield of the light olefin may be implemented, while excellent mechanical strength is implemented.

Thus, the catalyst may be used for a long period of time and economical production of a light olefin by a fluidized bed reactor which is industrially advantageous is possible.

More specifically, a mixed raw material including naphtha and methanol is subjected to catalytic cracking in the fluidized bed reactor to produce the light olefin with a high yield and high economic feasibility.

In the catalyst for preparing a light olefin of an embodiment of the present invention, an amount of $Ag_2O$ supported in the internal micropores and/or on the surface of the porous zeolite may be more than 0 wt % and 6 wt % or less with respect to 100 wt % of the catalyst. More specifically, the amount may be more than 0 wt % and less than 3 wt %, or 0.2 wt % or more and 2.2 wt % or less.

When $Ag_2O$ is supported in such an amount, acid site protection and excellent hydrothermal stability of the prepared catalyst may be implemented, and, simultaneously, high mechanical strength and a high yield of the light olefin may be implemented.

Since the catalyst shows excellent mechanical strength as well as high stability and a high yield of the light olefin, the catalyst may be advantageous for being used as a catalyst in a process of preparing the light olefin based on the fluidized bed reactor advantageous for commercialization.

The catalyst for preparing a light olefin of an embodiment of the present invention may satisfy the following Equation 1:

$$0 < W_a/W_b \leq 0.150 \qquad \text{[Equation 1]}$$

wherein $W_a$ is a content of $Ag_2O$ with respect to 100 wt % of the catalyst, and $W_b$ is a content of the clay with respect to 100 wt % of the catalyst.

More specifically, Equation 1 may satisfy the following Equation 2:

$$0.009 < W_a/W_b \leq 0.108 \qquad \text{[Equation 2]}$$

In the catalyst for preparing a light olefin of an embodiment of the present invention, contents of $Ag_2O$ and clay satisfy the above relationship, whereby the acid site protection and the excellent hydrothermal stability of the prepared catalyst may be implemented, and simultaneously high mechanical strength and a high yield of the light olefin may be implemented.

Since the catalyst shows excellent mechanical strength as well as high stability and a high yield of the light olefin, the catalyst may be advantageous for being used as a catalyst in a process of preparing the light olefin based on the fluidized bed reactor advantageous for commercialization.

In the catalyst for preparing a light olefin of an embodiment of the present invention, contents of the components other than $Ag_2O$ will be described in more detail. The catalyst for preparing a light olefin of an embodiment of the present invention may include 1 wt % or more and 70 wt % or less of the porous zeolite; 15 wt % or more and 50 wt % or less of the clay; 1 wt % or more and 40 wt % or less of the inorganic oxide binder; and 1 wt % or more and 20 wt % or less of $P_2O_5$ supported in the internal micropores and/or on the surface of the porous zeolite, with respect to 100 wt % of the catalyst.

More specifically, the catalyst for preparing a light olefin of an embodiment of the present invention may include 40 wt % or more and 70 wt % or less of the porous zeolite; 15 wt % or more and 40 wt % or less of the clay; 5 wt % or more and 30 wt % or less of the inorganic oxide binder; and 5 wt % or more and 20 wt % or less of $P_2O_5$ supported in the internal micropores and/or on the surface of the porous zeolite, with respect to 100 wt % of the catalyst.

Within the range, the excellent stability and the high yield of the light olefin of the catalyst may be implemented, but the present invention is not necessarily limited thereto.

In the catalyst for preparing a light olefin of an embodiment of the present invention, the porous zeolite may be ZSM-5, ZSM-11, Beta, Y-type zeolite, or a combination thereof, having a Si/Al molar ratio of 200 or less. However, though the present is not necessarily limited thereto, the Si/Al molar ratio may be preferably 200 or less, considering activity depending on the number of acid sites of the porous zeolite and economic feasibility of preparation.

In the catalyst for preparing a light olefin of an embodiment of the present invention, $Ag_2O$ supported on the porous zeolite may be derived from a silver precursor, and the silver precursor may be silver sulfate, silver nitrate, silver chloride, silver fluoride, or a combination thereof, but is not limited thereto.

In the catalyst for preparing a light olefin of an embodiment of the present invention, the clay may be unlimitedly montmorillonite, saponite, kaoline, clinoptilolite, bentonite, or a combination thereof, but is not limited thereto. The clay is included at the content described above to contribute to strength improvement of the catalyst without contributing to activity decrease of the catalyst.

In the catalyst for preparing a light olefin of an embodiment of the present invention, the inorganic oxide may serve as a binder during catalyst forming and include $Al_2O_3$, $SiO_2$, $Al_2O_3$—$SiO_2$, or a combination thereof, but is not limited thereto. The inorganic oxide binder is included at the content described above to contribute to strength improvement of the catalyst without contributing to activity decrease of the catalyst.

In the catalyst for preparing a light olefin of an embodiment of the present invention, $P_2O_5$ supported on the porous zeolite may be derived from a phosphorus precursor, and the phosphorus precursor may be $H_3PO_4$, $(NH_4)_3PO_4$, $H(NH_4)_2(PO_4)$, $H_2(NH_4)PO_4$, or a combination thereof, but is not limited thereto. $P_2O_5$ is included at the content described above to contribute to hydrothermal stability improvement of the catalyst without contributing to excessive activity decrease of the catalyst.

The catalyst for preparing a light olefin of an embodiment of the present invention may be formed into various shapes such as a spherical shape by extrudation, pelletizing, rotational spherical forming, spray dry, and the like and used in a process of preparing a light olefin, but it is an example and the present invention is not necessarily limited thereto.

The formed catalyst may have an average particle diameter of 50 μm or more and 300 μm or less, and more specifically 50 μm or more and 200 μm or less, and efficiency of the preparation reaction of a light olefin may be maximized in such a size, which is thus preferred.

Another embodiment of the present invention provides a method of preparing a catalyst for preparing a light olefin including: preparing a first mixed solution including a porous zeolite, a silver precursor, and a phosphorus precursor; mixing an inorganic oxide precursor, an inorganic acid, and clay with the first mixed solution to prepare a second mixed solution; spray-drying the second mixed solution; and performing firing.

This may correspond to a method of preparing the catalyst for preparing a light olefin of the embodiment of the present invention described above.

Thus, in order to prepare the catalyst for preparing a light olefin of the embodiment of the present invention described above, a content of a silver precursor in the second mixed solution may be an equivalent at which a content of $Ag_2O$ in the catalyst prepared in the firing step is more than 0 wt % and 6 wt % or less, more specifically more than 0 wt % and less than 3 wt %, or 0.2 wt % or more and 2.2 wt % or less, with respect to 100 wt % of the catalyst.

In addition, the content of the silver precursor and the content of the clay in the second mixed solution may be equivalents at which the catalyst prepared in the firing step satisfies the following Equation 1:

$$0 < W_a/W_b \leq 0.150 \qquad \text{[Equation 1]}$$

wherein $W_a$ is a content of $Ag_2O$ with respect to 100 wt % of the catalyst, and $W_b$ is a content of the clay with respect to 100 wt % of the catalyst.

More specifically, the contents may be equivalents satisfying the following Equation 2:

$$0.009 \leq W_a/W_b \leq 0.108 \quad \text{[Equation 2]}$$

In the method of preparing a catalyst for preparing a light olefin of an embodiment of the present invention, the silver precursor may be silver sulfate, silver nitrate, silver chloride, silver fluoride, or a combination thereof, but is not limited thereto.

In the method of preparing a catalyst for preparing a light olefin of an embodiment of the present invention, the clay may be unlimitedly montmorillonite, saponite, kaoline, clinoptilolite, bentonite, or a combination thereof, but is not limited thereto.

In the method of preparing a catalyst for preparing a light olefin of an embodiment of the present invention, the inorganic oxide precursor may include $Al_2O_3$, $SiO_2$, $Al_2O_3$—$SiO_2$, or a combination thereof, but is not limited thereto.

In the method of preparing a catalyst for preparing a light olefin of an embodiment of the present invention, the phosphorus precursor may be $H_3PO_4$, $(NH_4)_3PO_4$, $H(NH_4)_2(PO_4)$, $H_2(NH_4)PO_4$, or a combination thereof, but is not limited thereto.

In the method of preparing a catalyst for preparing a light olefin of an embodiment of the present invention, the inorganic acid may be a nitric acid, a sulfuric acid, or a combination thereof, but is not limited thereto.

The method of preparing a catalyst for preparing a light olefin of an embodiment of the present invention will be described in more detail. First, a first mixed solution including a porous zeolite, a silver precursor, and a phosphorus precursor is prepared, and water may be used as a solvent at this time. The first mixed solution may be prepared in a sol, gel, or solution state having a low viscosity, and the solution state may be most preferred.

Thereafter, an inorganic oxide precursor and an inorganic acid are mixed with the first mixed solution, in which a mixed solution of the inorganic oxide precursor and the inorganic acid may be mixed in a sol, gel, or solution state, and clay may be mixed therewith, thereby preparing a second mixed solution for spray drying.

Stirring may be performed upon mixing, and a stirring speed, a stirring time, and a stirring manner are not particularly limited in the present invention.

The thus-prepared second mixed solution is spray-dried and fired to prepare a microspherical catalyst. However, this is an example and various forming methods may be adopted depending on a desired catalyst form and the like, of course.

In the step of firing, it is preferred that a firing temperature may be 500° C. or higher and 700° C. or lower, and a firing time may be 5 hours or more and 10 hours or less, considering the activity, mechanical strength, and process economic feasibility of the catalyst to be prepared. However, the present invention is not necessarily limited thereto.

Hereinafter, an embodiment of the method of preparing a light olefin from the thus-prepared catalyst will be illustratively described.

A reactant containing naphtha and methanol is subjected to catalytic cracking in the presence of the prepared catalyst for preparing a light olefin of an embodiment of the present invention, thereby preparing a light olefin.

A weight ratio of naphtha/methanol in the reactant may be 0.1 to 5.

A light olefin preparation reaction may be performed in a fixed bed reactor or a fluidized bed reactor, and may be performed under the reaction conditions of a reaction temperature of 600° C. or higher and 700° C. or lower, a reaction pressure of 0.1 bar or higher and 2 bar or lower, a weight ratio of catalyst/overall reactant of 2 or more and 20 or less, and an injection speed at an injection flow rate of the reactant of 0.5 g/h or more and 2.0 g/h or less, based on a hydrocarbon injection rate. However, this is an example and the present invention is not limited thereto.

The fluidized bed reactor charges a fluidized bed catalyst and fluidizes the catalyst in the reactor. The naphtha and methanol raw materials supplied therewith are added from the bottom of the reactor, while a diluting gas is introduced so that a partial pressure of the reactant is decreased and fluidization is promoted. The diluting gas may be inert gas or steam, and preferably steam. Naphtha, methanol, and the diluting gas may be mixed with the catalyst or may fluidize the catalyst in the reactor.

The catalyst for preparing a light olefin of an embodiment of the present invention has excellent mechanical strength as well as a high light olefin yield, and thus, may be appropriate for being adopted in a fluidized bed reactor advantageous for commercialization.

In the fixed bed reactor, naphtha and methanol are supplied to the reactor with steam, and may be brought into contact with the fixed bed catalyst and reacted to produce a light olefin.

Hereinafter, the preferred Examples and Comparative Examples of the present invention will be described. However, the following Examples are only a preferred example, and the present invention is not limited thereto.

EXAMPLE 1

440 g of a ZSM-5 molecular sieve was slowly added to 380 g of distilled water with stirring to prepare a molecular sieve slurry, 110 g of an 85% phosphoric acid was further added, and stirring was performed at room temperature for 30 minutes. 1.5 g of 96% $Ag_2SO_4$ was added to the slurry and stirring was performed for 1 hour.

Thereafter, a solution in which 70 g of Boehmite ($Al_2O_3$ content of 72 wt %) was dispersed in a 2% nitric acid solution was further added, stirring was performed for 1 hour, 166 g of clay was added, and the materials were sufficiently mixed for 2 hours using a high-viscosity slurry mixer. The slurry was subjected to spray forming to obtain a molding catalyst as a microspherical catalyst having a particle size of 75 to 200 μm which was then fired at 500° C. for 5 hours, and a sample prepared for confirming a hydrothermal stability characteristic was charged into a quartz reactor and distilled water was injected at a speed of 5 cc/min with a liquid pump and vaporized to be brought into contact in a water vapor form with the sample. A hydrothermal treatment was performed at 760° C. for 24 hours under a 100% water vapor atmosphere.

EXAMPLE 2

The catalyst was prepared in the same manner as in Example 1, except that 4.5 g of 96% $Ag_2SO_4$ and 163 g of the clay were used.

EXAMPLE 3

The catalyst was prepared in the same manner as in Example 1, except that 7.5 g of 96% $Ag_2SO_4$ and 160 g of the clay were used.

EXAMPLE 4

The catalyst was prepared in the same manner as in Example 1, except that 10.5 g of 96% $Ag_2SO_4$ and 157 g of the clay were used.

EXAMPLE 5

The catalyst was prepared in the same manner as in Example 1, except that 13.5 g of 96% $Ag_2SO_4$ and 154 g of the clay were used.

EXAMPLE 6

The catalyst was prepared in the same manner as in Example 1, except that 16.5 g of 96% $Ag_2SO_4$ and 151 g of the clay were used.

EXAMPLE 7

The catalyst was prepared in the same manner as in Example 1, except that 22.5 g of 96% $Ag_2SO_4$ and 145 g of the clay were used.

EXAMPLE 8

The catalyst was prepared in the same manner as in Example 1, except that 44 g of 96% $Ag_2SO_4$ and 123 g of the clay were used.

COMPARATIVE EXAMPLE 1

The catalyst was prepared in the same manner as in Example 1, except that 167 g of the clay was used without $Ag_2SO_4$.

COMPARATIVE EXAMPLE 2

The catalyst was prepared in the same manner as in Example 1, except that 39 g of 96% $La(NO_3)_3$ and 155 g of the clay were used.

COMPARATIVE EXAMPLE 3

The catalyst was prepared in the same manner as in Example 1, except that 64 g of 97% $MgSO_4 \cdot 7H_2O$ and 152 g of the clay were used.

COMPARATIVE EXAMPLE 4

The catalyst was prepared in the same manner as in Example 1, except that 29.8 g of 99% $(CH_3CO_2)_2Mn \cdot 4H_2O$ and 157 g of the clay were used.

The chemical composition results of the Examples and the Comparative Examples are summarized in the following Table 1.

TABLE 1

|  | Comparative Example 1 | Example 1 | Example 2 | Example 3 | Example 4 | Example 5 | Example 6 | Example 7 | Example 8 | Comparative Example 2 | Comparative Example 3 | Comparative Example 4 |
|---|---|---|---|---|---|---|---|---|---|---|---|---|
| ZSM-5 | 60 | 60.0 | 60 | 60 | 60 | 60 | 60 | 60 | 60 | 60 | 60 | 60 |
| Clay | 22.5 | 22.3 | 21.9 | 21.5 | 21.1 | 20.7 | 20.3 | 19.5 | 16.5 | 21.1 | 21.1 | 21.1 |
| $Al_2O_3$ | 8.0 | 8.0 | 8.0 | 8.0 | 8.0 | 8.0 | 8.0 | 8.0 | 8.0 | 8.0 | 8.0 | 8.0 |
| $P_2O_5$ | 9.5 | 9.5 | 9.5 | 9.5 | 9.5 | 9.5 | 9.5 | 9.5 | 9.5 | 9.5 | 9.5 | 9.5 |
| $Ag_2O$ | 0 | 0.2 | 0.6 | 1.0 | 1.4 | 1.8 | 2.2 | 3 | 6 | — | — | — |
| $La_2O_3$ | — | — | — | — | — | — | — | — | — | 1.4 | — | — |
| MgO | — | — | — | — | — | — | — | — | — | — | 1.4 | — |
| MnO | — | — | — | — | — | — | — | — | — | — | — | 1.4 |
| Total | 100 | 100 | 100 | 100 | 100 | 100 | 100 | 100 | 100 | 100 | 100 | 100 |

The unit in Table 1 is wt %.

EXPERIMENTAL EXAMPLE 1

Mechanical strength of the prepared catalysts was measured in accordance with D5757 of the standard test method of American Society for Testing and Materials (ASTM).

50 g of the catalyst was charged into a chamber of a strength measurement device, a thimble having a known weight was installed, and air was flowed into the chamber for 5 hours at a flow velocity of 10 L/min.

After 5 hours, particles ground by air gathered in the thimble, and the weight of the ground catalyst was measured to calculate an attrition index. The results of Experimental Example 1 are summarized in Table 3.

EXPERIMENTAL EXAMPLE 2

Performance of the prepared catalyst for a naphtha and methanol mixed catalytic cracking reaction was confirmed using a fixed bed reactor.

0.1 g of the catalyst was charged in the fixed bed reactor, naphtha (b.p., 30-135° C.) and methanol which were used at the same weight ratio were injected as a reactant, an injection flow rate of the reactant was 0.87 g/h, based on a hydrocarbon injection rate, a reaction temperature was 650° C., and a reaction pressure was 1 bar.

Like a common fluidized bed naphtha catalytic cracking reaction, in a catalytic cracking reaction of a methanol and naphtha mixed raw material also, a catalyst after being subjected to a catalytic cracking reaction in a riser for catalyst regeneration and catalyst heating was heated to a high temperature in a regenerator and regenerated. Here, the catalyst was brought into contact with steam occurring during regeneration at a high temperature to cause dealumination of a zeolite framework, thereby performing deactivation of the catalyst. Therefore, all prepared catalysts were treated artificially at 760° C. for 24 hours under a 100% steam atmosphere, as in the above preparation method, and then catalytic performance was confirmed.

The compositions of naphtha used in Experimental Example 2 are shown in the following Table 2, and the results of the naphtha and methanol mixed catalytic cracking reaction are summarized in Table 3.

TABLE 2

| Hydrocarbon number | n-paraffin | Iso-paraffin | olefin | naphthene | aromatic | Total |
|---|---|---|---|---|---|---|
| 1 | — | — | — | — | — | 0.00 |
| 2 | — | — | — | — | — | 0.00 |
| 3 | — | — | — | — | — | 0.00 |
| 4 | 0.63 | — | 0.18 | — | — | 0.80 |
| 5 | 31.50 | 22.64 | — | — | — | 54.14 |
| 6 | 12.17 | 22.41 | 0.69 | 3.15 | 1.29 | 39.71 |
| 7 | — | 1.00 | 1.59 | 1.56 | 1.19 | 5.35 |
| Sum | 44.30 | 46.05 | 2.46 | 4.71 | 2.48 | 100.00 |

The unit in Table 2 is wt %.

The results of Table 3 show a product distribution of the catalytic cracking reaction of a methanol and naphtha mixed raw material in the catalysts after a hydrothermal treatment.

As seen from Table 3, it was found that the molding catalysts modified with silver and phosphorus prepared according to Examples 1 to 8 represented a higher yield of a light olefin ($C_2H_4+C_3H_6$) and a lower yield of methane than the catalyst not modified with silver of Comparative Example 1 and the catalysts modified with La, Mn, or Mg.

Meanwhile, in Examples 7 and 8 in which a silver supported amount was 3 wt % or more, it was found that a yield of a light olefin became lower than those of other Examples, and a yield of by-products was high.

Thus, when the silver supported amount was more than 0 wt % and less than 3 wt %, and more specifically 0.2 wt % or more and 2.2 wt % or less, the catalyst was better.

In addition, it was confirmed that Examples 1 to 6 in which a silver content to the clay in the catalyst was 0.009 or more and 0.108 or less showed a high yield of a light olefin while maintaining excellent mechanical strength.

The catalyst for preparing a light olefin of an embodiment of the present invention is a catalyst obtained by modifying an acid site of the porous zeolite with silver and phosphorus, further mixing an inorganic oxide binder and clay therewith, and stabilizing the mixture, and improves a yield of the light olefin and has excellent mechanical strength and hydrothermal stability to maintain a high activity characteristic for a long period of time.

In addition, simple preparation is possible as compared with conventional technology requiring a complicated zeolite modification step and a catalyst preparation step, and thus, the catalyst may be very advantageous for commercial application.

Simple modifications or alterations of the present invention are possible by those skilled in the art, but the modification or alterations are considered as being all included in the scope of the present invention.

TABLE 3

| | Comparative Example 1 | Example 1 | Example 2 | Example 3 | Example 4 | Example 5 | Example 6 | Example 7 | Example 8 | Comparative Example 2 | Comparative Example 3 | Comparative Example 4 |
|---|---|---|---|---|---|---|---|---|---|---|---|---|
| Attrition index | 6.2 | 4.5 | 3.9 | 2.9 | 2.6 | 2.7 | 2.8 | 2.7 | 2.5 | 6.9 | 4.8 | 5.3 |
| $Ag_2O$ content (wt %) | 0 | 0.2 | 0.6 | 1.0 | 1.4 | 1.8 | 2.2 | 3 | 6 | — | — | — |
| $La_2O_3$ | — | — | — | — | — | — | — | — | — | 1.4 | — | — |
| MgO | — | — | — | — | — | — | — | — | — | — | 1.4 | — |
| MnO | — | — | — | — | — | — | — | — | — | — | — | 1.4 |
| $P_2O_5$ content (wt %) | 9.5 | 9.5 | 9.5 | 9.5 | 9.5 | 9.5 | 9.5 | 9.5 | 9.5 | 9.5 | 9.5 | 9.5 |
| $Ag_2O$(wt %)/clay(wt %) | 0 | 0.009 | 0.027 | 0.047 | 0.066 | 0.087 | 0.108 | 0.154 | 0.364 | 0 | 0 | 0 |
| Gas product yield (wt %) | | | | | | | | | | | | |
| CO | 0.9 | 0.9 | 0.9 | 0.8 | 1.1 | 1.3 | 1.4 | 2 | 1.8 | 1.0 | 0.9 | 0.9 |
| $CH_4$ | 4.8 | 4.8 | 4.7 | 4.5 | 5.2 | 5.2 | 5.7 | 6.5 | 6.6 | 5.6 | 4.9 | 7.0 |
| $C_2H_4$ | 17.5 | 20.3 | 21.9 | 22.6 | 26 | 26.2 | 23.1 | 20.4 | 18.5 | 16.5 | 17.2 | 16.3 |
| $C_2H_6$ | 4.2 | 5.2 | 5.2 | 5.3 | 7.1 | 7.1 | 6.8 | 6.7 | 6.8 | 3.9 | 4.0 | 3.7 |
| $C_3H_6$ | 18.2 | 21.6 | 20.9 | 20.6 | 24.3 | 23.7 | 22.7 | 19.5 | 17.3 | 18.1 | 18.5 | 18.0 |
| $C_3H_8$ | 1.7 | 2.2 | 3.3 | 3.6 | 4.1 | 4.1 | 3.7 | 3.6 | 1.8 | 1.5 | 1.6 | 1.5 |
| $C_4$ | 6.5 | 8.6 | 7.4 | 7.1 | 8.3 | 8.1 | 7.7 | 7.6 | 5.3 | 5.4 | 5.9 | 5.5 |
| $C_2H_4 + C_3H_6$ | 35.7 | 41.9 | 42.8 | 43.2 | 50.3 | 49.9 | 45.8 | 37.9 | 35.8 | 34.6 | 35.7 | 34.3 |

In Table 3, wt % of Gas product yield refers to wt % of the product of each item for a total amount of the product.

The invention claimed is:

1. A catalyst for preparing a light olefin, the catalyst comprising:
   a porous zeolite;
   clay;
   an inorganic oxide binder; and
   $Ag_2O$ and $P_2O_5$ which are supported in internal micropores and/or on a surface of the porous zeolite, wherein 15 wt % or more and 40 wt % or less of the clay; and 5 wt % or more and 20 wt % or less of $P_2O_5$ supported in the internal micropores and on the surface of the porous zeolite are included, with respect to 100 wt % of the catalyst, and wherein the catalyst is configured to prepare a light olefin by catalytic cracking of a mixed raw material including naphtha and methanol.

2. The catalyst for preparing a light olefin of claim 1, wherein an amount of $Ag_2O$ supported in the internal micropores on the surface of the porous zeolite is more than 0 wt % and 6 wt % or less with respect to 100 wt % of the catalyst.

3. The catalyst for preparing a light olefin of claim 1, wherein an amount of $Ag_2O$ supported in the internal micropores on the surface of the porous zeolite is 0.2 wt% or more and 2.2 wt% or less with respect to 100 wt% of the catalyst.

4. The catalyst for preparing a light olefin of claim 1, wherein the catalyst for preparing a light olefin satisfies the following Equation 1:

$$<W_a/W_b \leq 0.150 \quad \text{[Equation 1]}$$

wherein $W_a$ is a content of $Ag_2O$ with respect to 100 wt % of the catalyst, and $W_b$ is a content of the clay with respect to 100 wt % of the catalyst.

5. The catalyst for preparing a light olefin of claim 3, wherein 1 wt % or more and 70 wt % or less of the porous zeolite; and 1 wt % or more and 40 wt % or less of the inorganic oxide binder; are further included, with respect to 100 wt % of the catalyst.

6. A method of preparing a light olefin, the method comprising: using the catalyst for preparing a light olefin of claim 1 to subject a hydrocarbon, an oxygen-containing organic compound, or a mixture thereof to catalytic cracking.

7. The method of preparing a light olefin of claim 6, wherein the catalyst is charged and fluidized in a fluidized bed rector.

8. A method of preparing a catalyst for preparing a light olefin, the method comprising:
preparing a first mixed solution including a porous zeolite, a silver precursor, and a phosphorus precursor;
mixing an inorganic oxide precursor, an inorganic acid, and clay with the first mixed solution to prepare a second mixed solution;
spray-drying the second mixed solution; and
performing firing.

9. The method of preparing a catalyst for preparing a light olefin of claim 8, wherein a content of the silver precursor in the second mixed solution is an equivalent at which a content of $Ag_2O$ in the catalyst prepared in the firing is more than 0 wt % and 6 wt % or less with respect to 100 wt % of the catalyst.

10. The method of preparing a catalyst for preparing a light olefin of claim 8, wherein a content of the silver precursor in the second mixed solution is an equivalent at which a content of $Ag_2O$ in the catalyst prepared in the firing is 0.2 wt % or more and 2.2 wt % or less with respect to 100 wt % of the catalyst.

11. The method of preparing a catalyst for preparing a light olefin of claim 8, wherein a content of the silver precursor and a content of the clay in the second mixed solution are equivalents at which the catalyst prepared in the firing satisfies the following Equation 1:

$$0 < W_a/W_b \leq 0.150 \quad \text{[Equation 1]}$$

wherein $W_a$ is a content of $Ag_2O$ with respect to 100 wt % of the catalyst, and $W_b$ is a content of the clay with respect to 100 wt % of the catalyst.

12. The method of preparing a catalyst for preparing a light olefin of claim 8,
wherein the catalyst prepared in the firing is the catalyst for preparing a light olefin, the catalyst comprising:
a porous zeolite;
clay;
an inorganic oxide binder; and
$Ag_2O$ and $P_2O_5$ which are supported in internal micropores and/or on a surface of the porous zeolite.

* * * * *